United States Patent [19]

De Wijn

[11] 4,398,736
[45] Aug. 16, 1983

[54] CART, UNDERCARRIAGE WITH FOLDABLE WHEELS

[76] Inventor: Jacques A. De Wijn, W. Alexanderdreef 28, Hoevelaken, Netherlands

[21] Appl. No.: 208,018

[22] Filed: Nov. 18, 1980

[51] Int. Cl.³ .............................. B62B 1/12; B62B 3/02
[52] U.S. Cl. ........................................ 280/40; 280/35; 280/646; 280/652
[58] Field of Search ................. 280/639, 640, 37, 638, 280/35, 38, 39, 40, 646, 651, 652

[56] References Cited

U.S. PATENT DOCUMENTS

| 1,128,333 | 2/1915 | Krna | 280/40 |
| 1,620,281 | 3/1927 | Oyston | 280/40 |
| 3,229,990 | 1/1966 | Weiner | 280/40 |
| 3,985,372 | 10/1976 | Olsson | 280/652 |

FOREIGN PATENT DOCUMENTS

| 7513895 | 6/1977 | Netherlands | 280/40 |
| 593884 | 10/1947 | United Kingdom | 280/39 |
| 1528582 | 10/1978 | United Kingdom | 280/40 |

Primary Examiner—David M. Mitchell
Assistant Examiner—Kenneth R. Rice
Attorney, Agent, or Firm—Armstrong, Nikaido, Marmelstein & Kubovcik

[57] ABSTRACT

An undercarriage comprising a rectangular, tubular frame defining a plane, two supporting members having upper U-shaped sections and angled lower sections, a pair of axles, a pair of wheels, and a pair of locking devices. Each upper U-shaped section is pivotally attached to one of the end members of the frame with the base portion of the U-shaped section extending above the plane when the supporting members are in an unfolded position. Each lower section is fixed to an end of one of the legs of the upper section and extends below the plane. Each axle is attached to a lower end of one of the angled lower sections. Each wheel is rotatably mounted on one of the axles. Each locking device is interconnected between one of the end members of the frame and one of the supporting members to lock that supporting member in the unfolded position. The supporting members are entirely within the plane defined by the frame when in a folded position.

3 Claims, 7 Drawing Figures

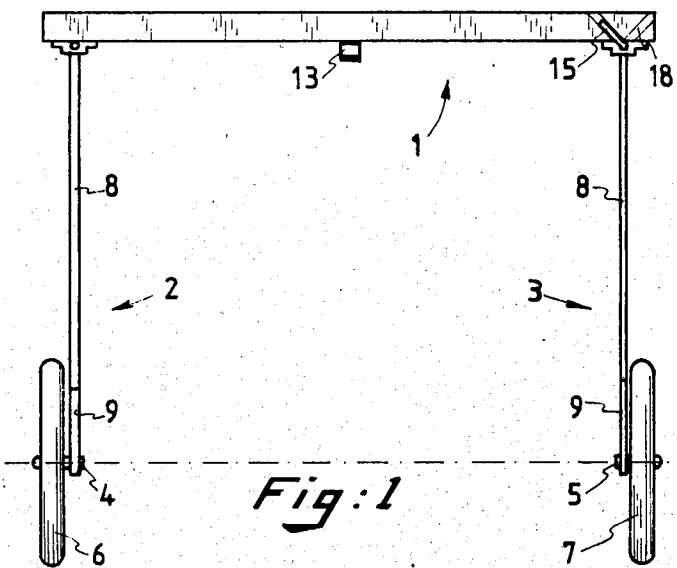
Fig:1
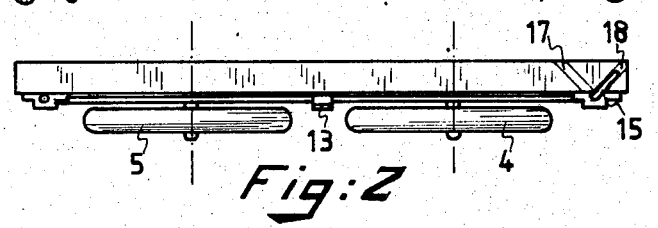
Fig:2
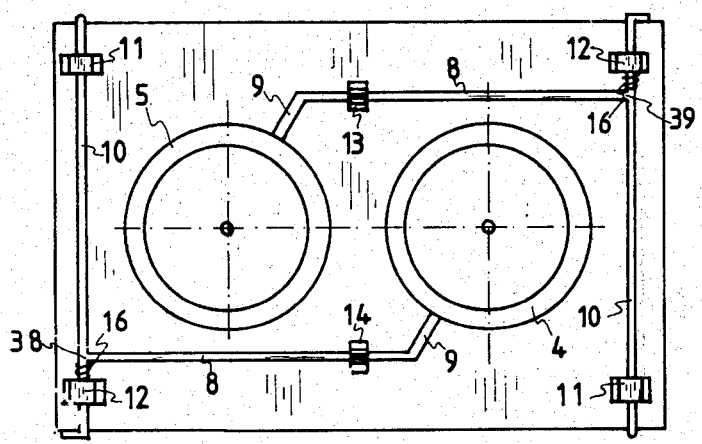
Fig:3

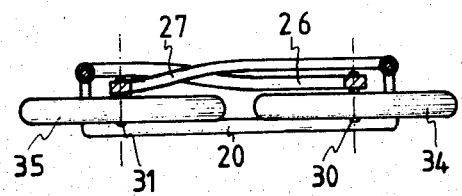
Fig: 4
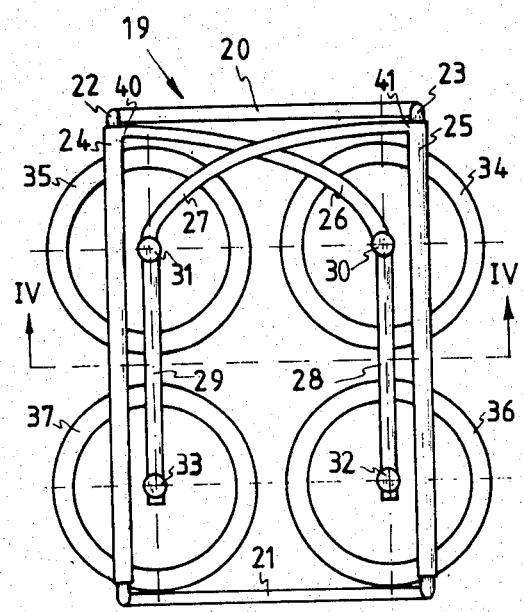
Fig: 5

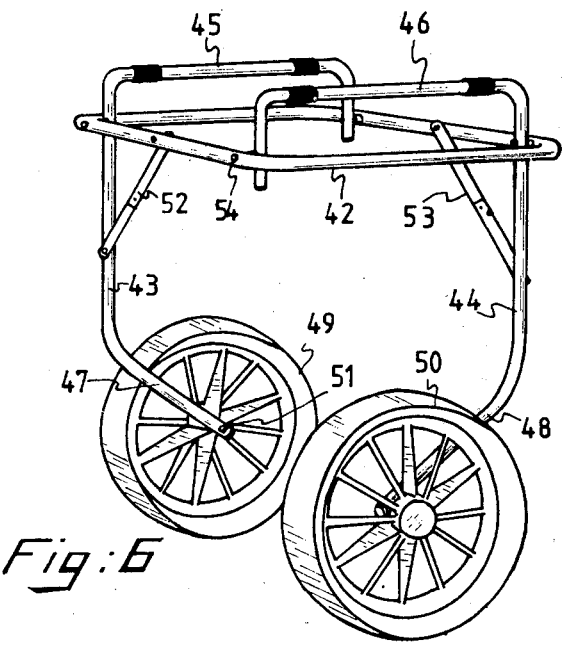
Fig: 6
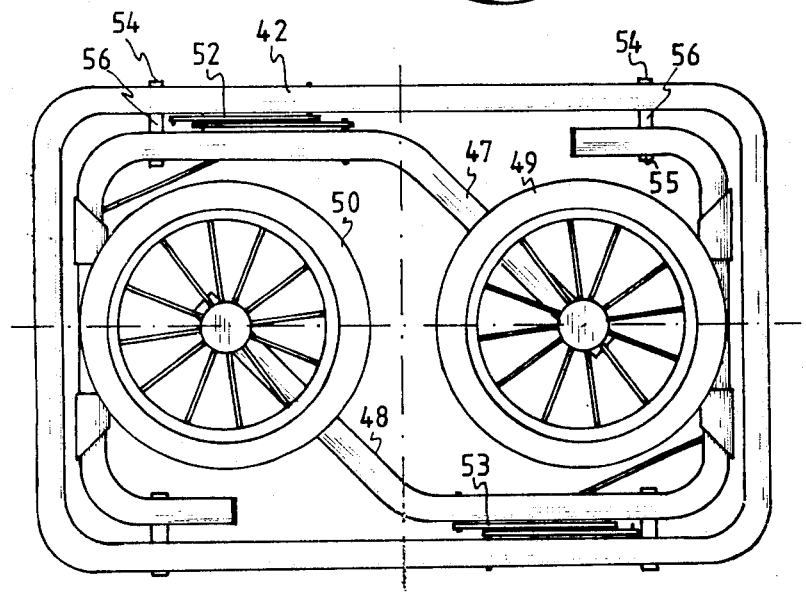
Fig: 7

CART, UNDERCARRIAGE WITH FOLDABLE WHEELS

The present invention relates to a cart, or baby-carriage undercarriage and the like, which comprises a frame and two or more wheels.

Well known are carriages, baby-carriages and the like. The transporting of, for example, baby-carriages by automobile can involve many problems because of the dimensions of such carriages. For this reason, there are baby-carriages on the market which can be entirely disassembled. The disadvantage of a known baby-carriage which can be disassembled is that the components have to be taken apart and yet they still need a large amount of space; and if the components are taken apart for transport, it takes additional time and energy to assemble the components together.

The aim of the present invention is to provide a cart or baby-carriage undercarriage in which the wheels can be folded in an easy way.

According to the invention, this purpose is reached with a cart having a wheel which can be unfolded or folded underneath a frame with connecting means which can keep the wheels in one or more preferred positions. In the unfolded position, the axis of rotation of two wheels are in line. Supporting members connect the axles of the wheels to the frame. Each of the supporting members together with the wheel can pivot about an axis, which is in a plane close to the plane of rotation of the wheel. In the folded position of one of the wheels, the other wheel can be folded over the first wheel towards the folded position such that the supporting member of the first wheel stays outside of the circumference of the other wheel while the supporting member of the other wheel stays outside the circumference of the first wheel.

According to a preferred embodiment of the cart, as seen in the moving direction of the cart, the fastening point or the pivoting point of one of the supporting members is situated before the wheels and the fastening point or pivoting point of the other supporting member is situated behind the wheels. With this embodiment, both wheels can be pressed against the bottom of the frame without the supporting members of both wheels being in touch with each other.

In another embodiment of the cart according to the invention, both pivoting or fastening points of both supporting members are situated before or behind the wheels. The supporting members are folded like the arms of a pair of glasses. A cart according to this embodiment cannot be folded as compactly but has for the sake of appearances, a much better look.

According to another embodiment of the invention, the cart can have four wheels if the axle of one of the two wheels is connected to the axle of a third wheel and the axle of a second wheel to the axle of a fourth wheel. Such a cart or undercarriage can be used as a baby-carriage or baby coach or the like. Such a baby-carriage, for example, is made of two parts, an undercarriage and an upper part, which can be placed upon the undercarriage. According to the present invention, the undercarriage can be folded or unfolded.

BRIEF DESCRIPTION OF THE DRAWINGS

The invention will now be described with reference to the accompanying drawings in which:

FIG. 1 is a side elevational view of a cart according to the invention with unfolded wheels;

FIG. 2 is a side view of the cart of FIG. 1, with the wheels folded underneath;

FIG. 3 is a bottom view of the cart of FIGS. 1 and 2, with the wheels folded underneath;

FIG. 4 is a side elevation view of another embodiment of a cart according to the invention;

FIG. 5 is a top view of the cart of FIG. 4;

FIG. 6 is a perspective view of still another embodiment of a cart according to the invention; and FIG. 7 is a bottom view of the cart of FIG. 6, with the wheels folded underneath.

DETAILED DESCRIPTION OF THE PREFERRED EMBODIMENTS

FIGS. 1, 2 and 3 show a possible embodiment of a cart according to the invention. The cart comprises a frame 1 having supporting members 2, 3 to which are connected the axles 4, 5 of two wheels 6, 7. The axles 4, 5 of the two wheels are in line if in the unfolded position (FIG. 1). In this embodiment of the cart, the supporting members each consist of two parts, a bar 8 and a rod 9. The bar 8 and the rod 9 are fixed together at an angle to each other. At the other end of the rod 9 is connected the axle 4, 5 of one of the wheels 6, 7. To the other end of bar 8, a tube 10 is connected at a right angle. Tube 10 is pivotally connected to the frame by supports or bearings; in this embodiment, the frame consists of a board. The wheels 6, 7 can be kept clamped against the board by clamps 13, 15. To keep the wheels fixed in the unfolded position, the bars 8 have at their ends cross-bars 15, which are held in one of two grooves 17, 18, in the board by a spring 16. According to this embodiment of the invention, such a cart is very useful for transporting surf boards, for example, from the car to the water. The tube 10 is the axis of pivotation.

FIGS. 4 and 5 show another embodiment of the invention. This embodiment has an undercarriage with wheels which may be folded underneath. The undercarriage comprises a frame 19, which is made of two U-shaped bars 20, 21. The straight bars 22, 23 connect the far ends of the legs of the U-shaped bars 20, 21. Around each of the straight bars 22, 23, are placed tubes 24, 25 which can freely pivot around the straight bars. Near one end of each of the tubes is connected a bent bar 26, 27. The bent bar can be welded to the tube. The bent bars 26, 27 have such a form that the wheels can be folded underneath inside of the framework. In this manner, the undercarriage can be folded together in a very little space.

Near one of the ends of each of the bent bars 26, 27, are connected the axles 30, 31 and 32, 33 of the wheels 34, 35 and 36, 37. In this embodiment, the supporting members which interconnect the wheels with the frame are the bent bars 26, 27.

In the first embodiment of the invention shown in FIGS. 1, 2 and 3, the connection point or pivoting point 38 of the supporting members 2 and the frame 1 is before (or behind respectively) both of the wheels 6, 7. The connection point or pivoting point of the supporting member 3 and the frame 1 is behind (or before respectively) both of the wheels. This symmetrical embodiment of the cart according to the invention can be folded together in an easy way within a little space.

In the second embodiment, as shown in FIGS. 4 and 5, the connection point or pivoting point 40 of the supporting members (the bent bar 26) of the wheels 34, 36 with the frame 19 and the connection point 41 of the supporting member (the bent bar 27) of both other wheels 35, 36 with the frame 19 are both behind or both before the wheels. This second embodiment of the undercarriage according to the invention can be folded together only in one possible way into a small compass; the bent bars 26, 27 both need to be turned in a special way to have them fit most flatly.

Referring to FIGS. 6 and 7, a third embodiment of the cart comprises a rectantualar frame 42 and two supporting members 43, 44 of tubular cross-section. The frame is formed of a rectangular bended tube. Each of the supporting members 43, 44 has an upper secton 45, 46, which is U-shaped. Both legs of each U-shaped upper section are pivotally fixed to the frame 42. A lower section 47, 48 which is angled is attached to one of the legs. The lower end of the lower section has fixed thereto an axle and a wheel 49, 50, rotatably mounted thereon.

The two supporting members 43, 44 can each be held in the unfolded position by a locking device 52, 53. To keep the mutual distance between the supporting members 43, 44 and the frame 42 constant, the supporting members 43, 44 can be connected to the frame 42 by bolts 54 and nuts 55 having spacer tubes 56 between the supporting members and the frame.

This third embodiment of the cart according to the invention is very similar to the first embodiment shown in FIGS. 1, 2 and 3; the wheels 49 and 50 have a broad tread, and thus, a large bearing surface which enables the wheels to easily run over sand. This embodiment can be generally used also to carry one or more surfboards over the beach or sand into the water.

I claim:

1. A cart undercarriage comprising:
   a rectangular tubular frame having two side members and two end members and defining a plane;
   two supporting members, each having an upper U-shaped section and an angled lower section, each U-shaped section having a base portion and two legs, each leg of each U-shaped section being pivotally attached to one of said end members, said base portion extending above said plane when said supporting members are in an unfolded position, each lower section being fixed to an end of one of said legs and extending below said plane;
   two axles, each axle being attached to a lower end of one of said angled lower sections;
   two wheels, each wheel being rotatably mounted on one of said axles; and
   two locking devices, each locking device being interconnected between one or said end members and one of said supporting members to lock said one of said supporting members in said unfolded position, said supporting members being entirely in said plane in a folded position.

2. The undercarriage of claim 1, further comprising bolts, nuts and spacer tubes pivotably interconnecting said legs to said end members, said spacers tubes surrounding said bolts between said legs and said end members.

3. The undercarriage of claim 2, wherein a first distance between an axis of rotation of one of the wheels and an axis of pivotation of the associated supporting member is more than one-half of a second distance between the axes of pivotation of both supporting members and wherein each wheel having a radius, said radius being less than a difference between said first distance and one-half of said second distance.

* * * * *